US011958695B2

(12) United States Patent  
Carpenter

(10) Patent No.: US 11,958,695 B2  
(45) Date of Patent: Apr. 16, 2024

(54) POWERED, ANGLED-ROLLER ARRAY DELAMINATION EQUIPMENT

(71) Applicant: Körber Supply Chain LLC, DFW Airport, TX (US)

(72) Inventor: Michael D. Carpenter, Arlington, TX (US)

(73) Assignee: Körber Supply Chain LLC, DFW Airport, TX (US)

( * ) Notice: Subject to any disclaimer, the term of this patent is extended or adjusted under 35 U.S.C. 154(b) by 881 days.

(21) Appl. No.: 16/977,179

(22) PCT Filed: Apr. 16, 2019

(86) PCT No.: PCT/US2019/027628  
§ 371 (c)(1),  
(2) Date: Sep. 1, 2020

(87) PCT Pub. No.: WO2019/204273  
PCT Pub. Date: Oct. 24, 2019

(65) Prior Publication Data  
US 2021/0039895 A1  Feb. 11, 2021

Related U.S. Application Data

(60) Provisional application No. 62/659,967, filed on Apr. 19, 2018.

(51) Int. Cl.  
*G06F 7/00* (2006.01)  
*B07C 1/04* (2006.01)  
(Continued)

(52) U.S. Cl.  
CPC ............ *B65G 47/1492* (2013.01); *B07C 1/04* (2013.01); *B07C 5/02* (2013.01); *B65G 43/08* (2013.01);  
(Continued)

(58) Field of Classification Search  
CPC .... B65G 47/1492; B65G 43/08; B65G 47/31; B65G 47/682; B65G 59/12; B07C 1/04; B07C 5/02  
(Continued)

(56) References Cited

U.S. PATENT DOCUMENTS 6,740,901 B2   5/2004  Miki et al.

FOREIGN PATENT DOCUMENTS

| EP | 0478981 A1 * | 6/1991 | ............. B65G 47/28 |
| EP | 0478981 A1 | 4/1992 | |

(Continued)

OTHER PUBLICATIONS

PCT International Search Report and Written Opinion of International Searching Authority dated Jul. 16, 2019 corresponding to PCT International Application No. PCT/US2019/027628 filed Apr. 16, 2019.

*Primary Examiner* — Yolanda R Cumbess  
(74) *Attorney, Agent, or Firm* — Price Heneveld LLP

(57) ABSTRACT

A system (100) for delaminating a stream (110) of articles (A, B, C, D, E) includes a delamination unit (130) with a plurality of individually controlled rollers (134) configured to carry a stream (110) of articles (A, B, C, D, E), a detection unit (150) with a sensor (152), and a control unit (160) with a processor (162) and interfacing with the delamination unit (130) and the detection unit (150), wherein the detection unit (150) is configured to detect a position of each of the articles (A, B, C, D, E) and to transmit position data to the control unit (160), and wherein the control unit (160) is configured, through operation of the processor (162), to correlate positions of the articles (A, B, C, D, E) with the plurality of individually controlled rollers (134), and to individually control the rollers (134) based on the position data to delaminate the stream (110) of articles (A, B, C, D, E).

14 Claims, 2 Drawing Sheets

(51) Int. Cl.
  *B07C 5/02* (2006.01)
  *B65G 43/08* (2006.01)
  *B65G 47/14* (2006.01)
  *B65G 47/31* (2006.01)
  *B65G 47/68* (2006.01)
  *B65G 59/12* (2006.01)

(52) U.S. Cl.
  CPC ........... *B65G 47/31* (2013.01); *B65G 47/682* (2013.01); *B65G 59/12* (2013.01)

(58) Field of Classification Search
  USPC ........................................ 700/213, 228, 230
  See application file for complete search history.

(56) References Cited

FOREIGN PATENT DOCUMENTS

| WO | 0066280 A2 | 11/2000 | |
|---|---|---|---|
| WO | WO-0066280 A2 * | 11/2000 | ............. B65G 43/08 |
| WO | 0076887 A1 | 12/2000 | |
| WO | WO-0076887 A1 * | 12/2000 | ........... B65G 1/0478 |

\* cited by examiner

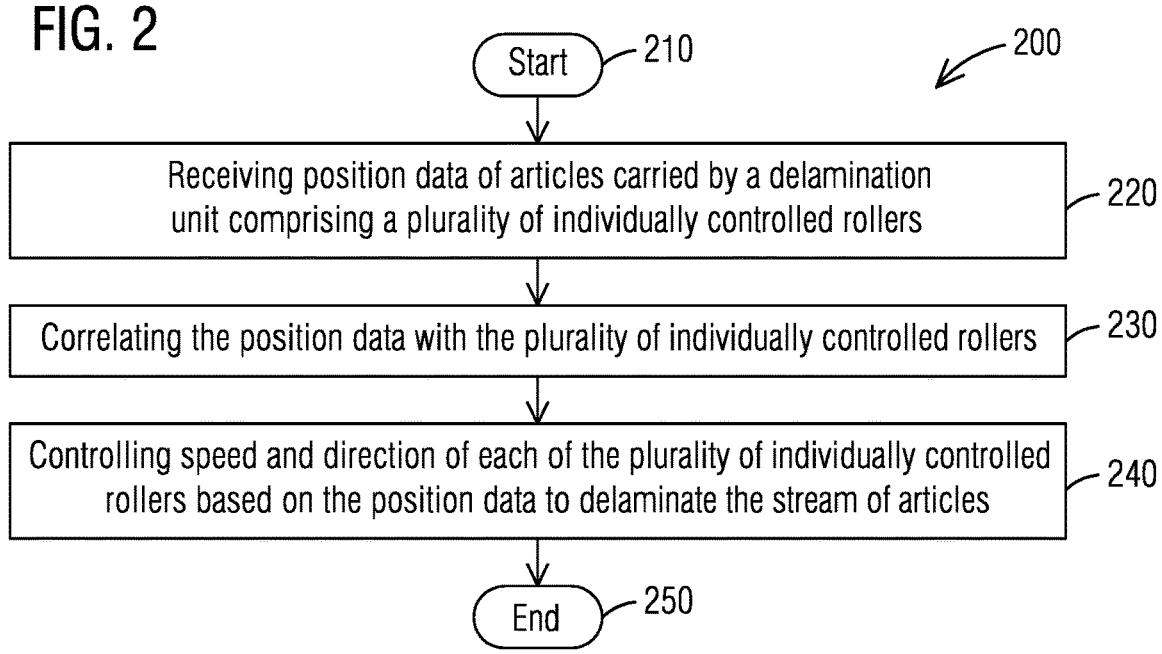
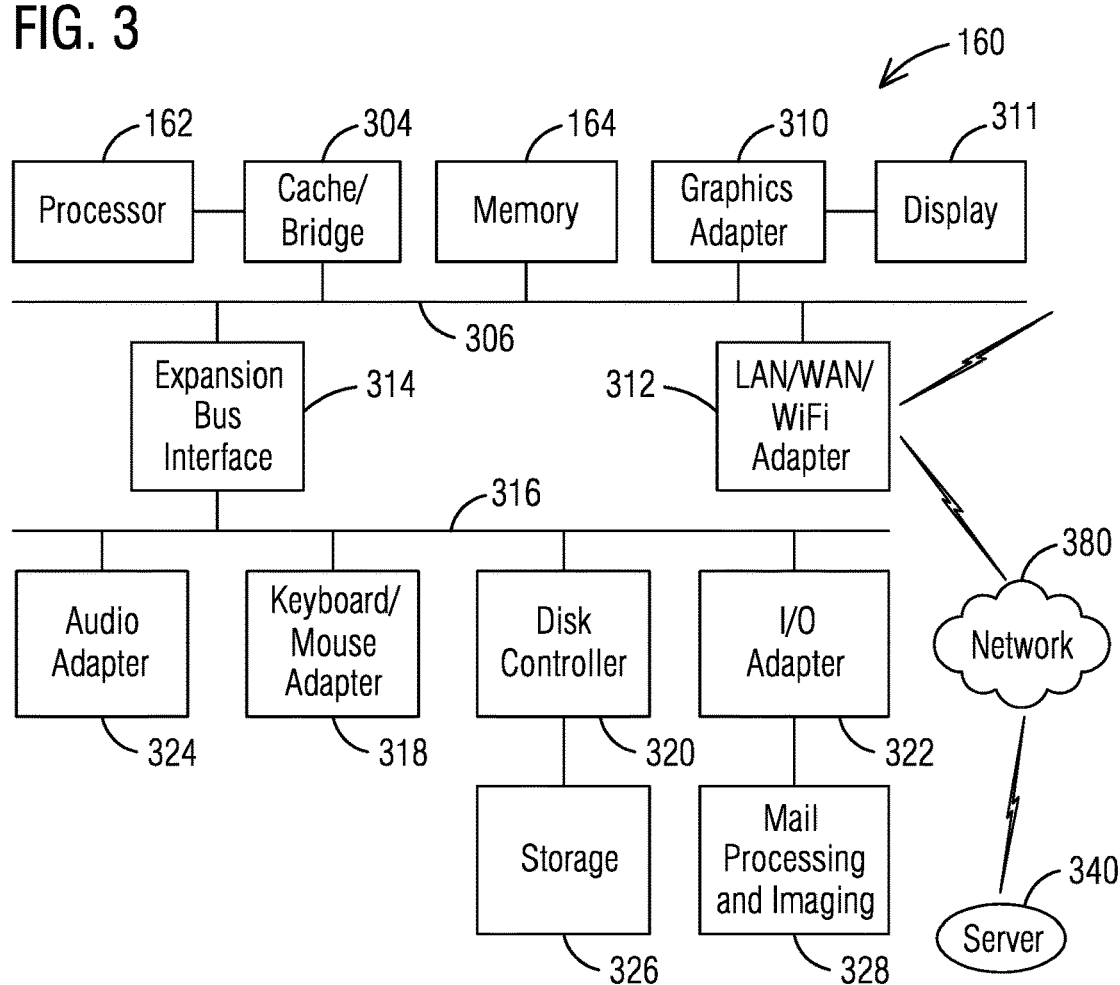

POWERED, ANGLED-ROLLER ARRAY DELAMINATION EQUIPMENT

BACKGROUND

1. Field

Aspects of the present disclosure generally relate to the technical field of mail and parcel processing techniques. Specifically, the present disclosure relates to a system and a method for delaminating a stream of articles, such as for example parcels.

2. Description of the Related Art

In automatic processing of parcels and other items, items are typically processed in bulk, which means that as the items are being conveyed, there may be multiple items comingled in a 3-dimensional space, allowing for highly efficient utilization of conveyors. Certain processing and handling steps require individualized manipulation of the items being processed, which requires de-mingling of the items in the 3-dimensional space, so the items are conveyed one-by-one. This is often a manual process, but automated methods have existed for different aspects of the problem, such as for example the aspect of items that are laminated, i.e. stacked one on top of the other.

Known methods are challenged today by wider variation in the formats of items, higher standards of automation in which manual "tending" (spotting and resolving exceptions) is less acceptable, and in the footprint constraints in which more equipment is expected to fit in preexisting facilities. Thus, an improved system having de-shingling performance with a smaller footprint may be desired.

SUMMARY

A first aspect of the present disclosure provides a system for delaminating a stream of articles comprising a delamination unit comprising a plurality of individually controlled rollers configured to carry a stream of articles, a detection unit comprising at least one sensor, and a control unit comprising at least one processor and interfacing with the delamination unit and the detection unit, wherein the detection unit is configured to detect a position of each of the articles and to transmit position data to the control unit, and wherein the control unit is configured, through operation of the at least one processor, to correlate positions of the articles with the plurality of individually controlled rollers, and to individually control the rollers based on the position data to delaminate the stream of articles.

A second aspect of the present disclosure provides a method for delaminating a stream of articles comprising, through operation of at least one processor in a control system configured via executable instructions included in at least one memory, receiving position data of articles carried by a delamination unit comprising a plurality of individually controlled rollers, correlating the position data with the plurality of individually controlled rollers, and controlling speed and direction of each of the plurality of individually controlled rollers based on the position data to delaminate the stream of articles.

A third aspect of the present disclosure provides a non-transitory computer readable medium comprising instructions that when executed by at least one processor perform a method for delamination a stream of articles as described herein.

BRIEF DESCRIPTION OF THE DRAWINGS

FIG. 2 depicts a flow chart of a method for delaminating a stream of articles in accordance with an exemplary embodiment of the present disclosure.

FIG. 3 depicts a block diagram of a control system of a system for delaminating a stream of articles in accordance with an exemplary embodiment of the present disclosure.

DETAILED DESCRIPTION

Figure 1:
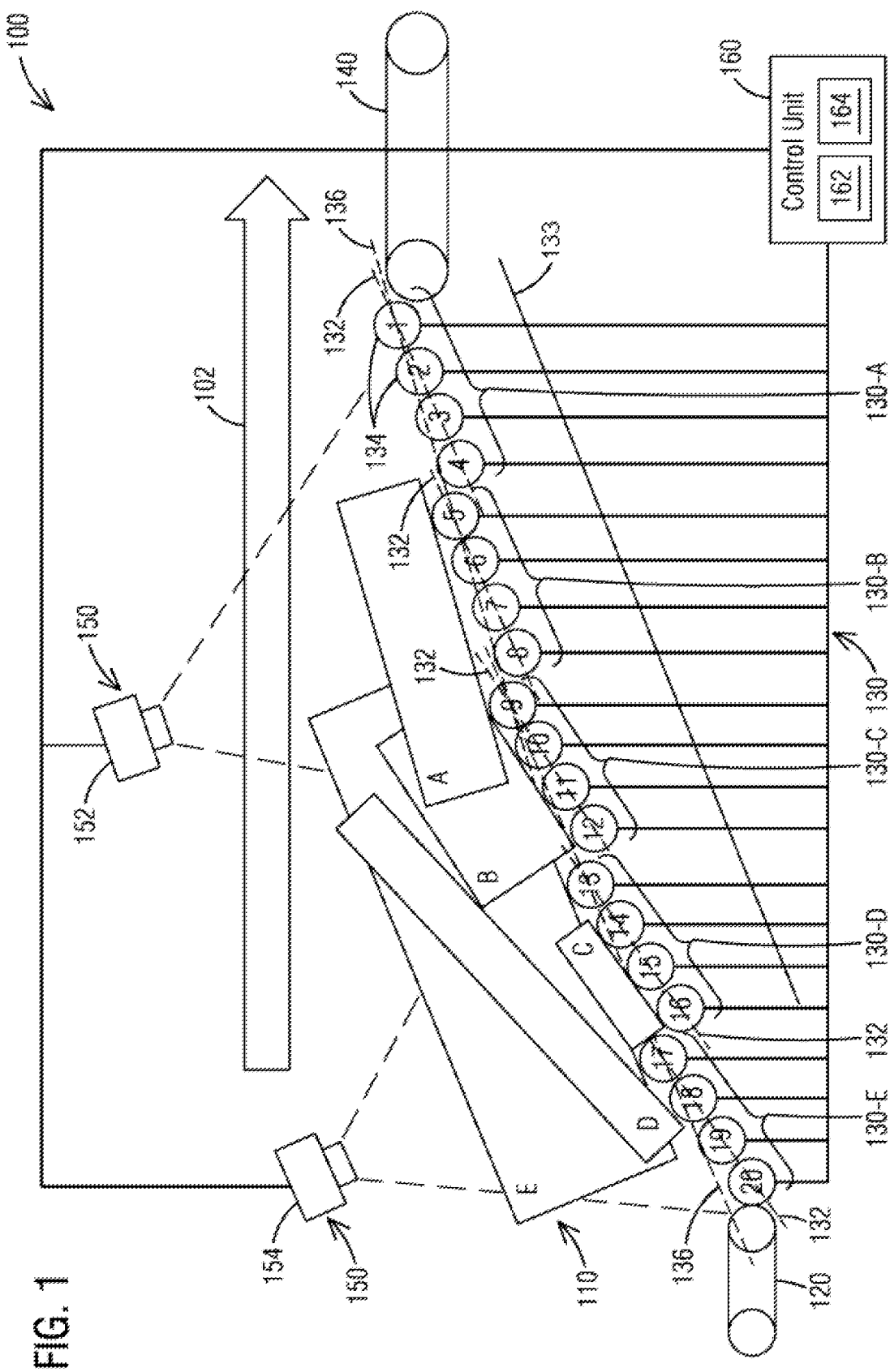
FIG. 1 depicts a schematic view of system for delaminating a stream of articles in accordance with an exemplary embodiment of the present disclosure.

To facilitate an understanding of embodiments, principles, and features of the present disclosure, they are explained hereinafter with reference to implementation in illustrative embodiments. In particular, they are described in the context of being a system and a method for delaminating a stream of articles, such as for example parcels, packages or other mail items. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

FIG. 1 depicts a schematic view of system for delaminating a stream of articles accordance with an exemplary embodiment of the present disclosure. The stream of articles comprises for example parcels, and it should be noted that the terms parcel and package are used interchangeably herein.

As noted, in automatic processing of parcels and other items, items are typically processed in bulk, which means that as the items are being conveyed, there may be multiple items comingled in a 3-dimensional space, allowing for highly efficient utilization of conveyors. Certain processing and handling steps require individualized manipulation of the items being processed, which requires de-mingling of the items in the 3-dimensional space, herein referred to as 'delamination', so that the items are conveyed one-by-one. The terms 'lamination' and 'delamination' as used herein refer to the arrangement and re-arrangement of a disordered stream of parcels or other items with respect to a 3-dimensional space. After delamination, the parcels or other items are not stacked one on top of the other, but still may be arranged in a 2-dimensional space, for example side-by side. 'Singulation' refers to the re-arrangement of a disordered flow or stream of articles into one or more single-file output streams (absence of side-by-side parcels).

FIG. 1 illustrates a system 100 for delaminating a stream 110 of articles, herein also referred to as delamination system 100 or simply system 100. For example, a mail processing facility includes such a delamination system 100. The stream 110 of articles comprises a plurality of parcels A, B, C, D and E. Typically, the stream 110 comprises many more parcels or items as an incoming stream travelling toward the delamination system 100.

The delamination system 100 defines a transport path illustrated by arrow 102 and comprises an infeed conveyor belt 120, an inclined and laterally tilted delamination unit 130 and an output conveyor belt 140. Further, the system 100 comprises a detection unit 150 and a control unit 160.

In operation of the delamination system 100, bulk stacks of parcels or other mail items, such as parcels A, B, C, D, E, are loaded, either by human operators or automated by machines, onto the infeed conveyor belt 120. The delamination unit or module 130 comprises multiple individually and selectively controlled rollers 134, labeled as rollers 1 to 20. The control unit or central processing unit 160, through the detection unit 150, detects positions and movement of parcels A, B, C, D, E on the delamination unit 130, and in response controls and powers the multiple rollers 134 to effect delamination of stacks of parcels, such as stream 110, into a sequence of de-laminated parcels. After delamination, the parcels A, B, C, D, E continue to move downstream onto the output conveyor belt 140 for further processing, such as for example singulation or sorting.

In an exemplary embodiment of the present disclosure, the delamination unit 130 comprises multiple individually and selectively controlled rollers 134, labeled as rollers 1 to 20, arranged on a laterally tilted inclined plane 133. The plane 133 is herein also referred to as the primary (conveyor) plane 133. Further, the delamination unit 130 comprises multiple secondary (conveyor) planes 132, 136 that are oriented in such a way as to allow sophisticated manipulation and control of a wider range of formats with respect to the articles A, B, C, D, E. Gravity and balance of friction, a multi-plane arrangement and individual controls are employed. In addition, the range in item sizes is taken into account in determination of the arrangement and extent of individual secondary planes 132, 136.

The multiple secondary planes 132, 136 of the delamination unit 130 are provided through specific arrangement and grouping of the rollers 134. Planes 132 label planes within a group of rollers, whereas planes 136 label planes between groups.

The example of FIG. 1 illustrates five groups of rollers 134, which are groups 130-A, 130-B, 130-C, 130-D and 130-E. Each group comprises four rollers 134. Group 130-A includes rollers 1-4, group 130-B includes rollers 5-8, group 130-C includes rollers 9-12, group 130-D includes rollers 13-16 and group 130-E includes rollers 17-20. It should be noted that the delamination unit 130 may comprise many different configurations with respect to number of groups of rollers 134 and number of rollers 134 within a group. For example, delamination unit 130 may comprise 31 rollers with ten groups of rollers, wherein five groups each comprise three rollers, three groups each comprise four rollers, and two groups each comprise two rollers.

Each group 130-A, 130-B, 130-C, 130-D and 130-E comprises a secondary plane 132 defined by the outer rollers of each group. For example, rollers 1 and 4 of group 130-A define plane 132.

Further, the delamination unit 130 comprises additional secondary planes 136 between the groups 130-A, 130-B, 130-C, 130-D and 130-E of rollers 134. Each first roller 134 of each group 130-A, 130-B, 130-C, 130-D and 130-E may define one or more planes 136. For example, rollers 1, 5 and 9 define a plane 136, and rollers 9, 13 and 17 define a plane 136. The arrangement of a height of each roller 134 in relationship to one another establishes the multiple planes 132, 136.

In an exemplary embodiment, the detection unit 150 comprises a vision unit with at least one image sensor. In our example, the vision system comprises two image sensors 152, 154, wherein each sensor 152, 154 is for example a digital camera. The sensors 152, 154, e.g., digital cameras, are arranged so that they cover essentially a whole surface, i.e. length and width, of the delamination unit 130 to detect locations of the articles A, B, C, D, E. Specifically, the image sensors 152, 154 are arranged and configured to detect a position, size and orientation of each of the articles A, B, C, D, E and to transmit position, size and orientation data to the control unit 160. It should be noted that the detection unit 150 may comprise more or less than two image sensors, and that instead of digital cameras, other devices capable of providing position, size and orientation data may be utilized.

The delamination system 100 further comprises the control unit 160 with at least one processor 162. The control unit 160 interfaces with the detection unit 150 and the delamination unit 130, specifically with each of the rollers 134 of the delamination unit 130. The control unit 160 is configured to receive data and information from the detection unit 130, to process the data and information, and to control and power individually the rollers 134 based on processed data and information. The data transmission between the control unit 160 and the detection unit 150 and delamination unit 130 may be wired, for example via Ethernet cable, or may be wireless, for example via Internet (Wi-Fi).

In an exemplary embodiment, the control unit 160 is configured, through operation of the at least one processor 162, to correlate at least positions of the articles A, B, C, D, E with the plurality of individually controlled rollers 134, and to individually control the rollers 134 based on the position data to delaminate the stream 110 of articles A, B, C, D, E. Further, the control unit 160 is configured to correlate size and orientation of the articles A, B, C, D, E with the plurality of individually controlled rollers 134. Specifically, the control unit 160 is configured to individually control speed and direction of each of the rollers 134 of the delamination unit 130.

In a further exemplary embodiment of the present disclosure, the detection unit 150 is configured to continuously track the positions of the articles A, B, C, D, E, and to continuously transmit position data to the control unit 160. The control unit 160 is further configured, through operation of the at least one processor 162, to optimize the speed and direction of each roller 134 based on continuously transmitted position data to delaminate and/or singulate the stream 110 of articles A, B, C, D, E.

FIG. 2 depicts a flow chart of a method 200 for delaminating a stream of articles in accordance with an exemplary embodiment of the present disclosure. While the method 200 is described as a series of acts that are performed in a sequence, it is to be understood that the method 200 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 200 may start at 210 and may include an act 220 of receiving position data of articles A, B, C, D, E carried by a delamination unit 130 comprising a plurality of individually controlled rollers 134. The method 200 may also include an act 230 of correlating the position data with the plurality of individually controlled rollers 134, and an act 240 of controlling speed and direction of each of the plurality of individually controlled rollers 134 based on the position data to delaminate the stream 110 of articles A, B, C, D, E. At 250, the method 200 may end. It should be appreciated that this described method 200 may include additional acts and/or alternative acts corresponding to the features described with respect to the delamination system 100 and control unit 160 (see FIG. 1 and FIG. 3).

In an embodiment, the method 200 may further include act(s) of receiving size and orientation data of the articles A, B, C, D, E carried by the delamination unit 130, correlating the size and position data with the plurality of individually controlled rollers 134 of the delamination unit 130, and controlling the speed and direction of each of the plurality of individually controlled rollers 134 based on the size and orientation data to delaminate the stream 110 of articles A, B, C, D, E.

In another embodiment, the method 200 may further include an act of individually controlling speed and direction of each of the rollers 134 of the delamination unit 130. In another embodiment, the method 200 may further include an act of updating and/or optimizing the speed and direction of each roller 134 based on continuously received position data to delaminate and/or singulate the stream 110 of articles A, B, C, D and E.

In our example as depicted in FIG. 1, a delamination process may be performed as described below. An object of the delamination system 100 is to move the items or articles A, B, C, D, E onto the downstream conveyor 140 individually, e.g., singulated, or at a minimum delaminated.

Item A: Activate rollers 5 and 9 forward (clockwise) until trailing edge of item A clears roller 9, then active rollers 5 through 3 forward until trailing edge of item A clears roller 5, then activate rollers 1 through 4 forward until trailing edge of item A clears roller 1.

Item E: Activate rollers 9, 13 and 17 forward unit trailing edge of item E clears roller 13, while potentially activating rollers 10 through 12 reverse (counter-clockwise) to hold item B. When trailing edge of item E passes roller 13, activate rollers 1, 5 and 9 forward.

Item B: Activate rollers 9 through 12 forward, while potentially pulling item D back by reversing roller 17, etc.

The size of the rollers 134, e.g., their pitch, is such that the item with a shortest length has contact with at least two rollers 134 at all times. The number of rollers 134 in the short planes (planes 132) may be targeted at a significant mode in standard distribution of item lengths process by the system 100.

Since the rollers 134 of the delamination unit 130 are individually controlled in terms of their speed and direction, the delamination system 100 allows unique control over items, such as items A, B, C, D, E, depending on their length and position. The detection unit 150, e.g., vision unit, continuously tracks the positions of items so that the rollers' speed and direction are continuously updated and optimized by the control unit 160 to delaminate or even to singulate.

It should be appreciated that acts associated with the above-described methodologies, features, and functions (other than any described manual acts) may be carried out by one or more data processing systems, such as for example control unit 160 via operation of at least one processor 162. As used herein, a processor corresponds to any electronic device that is configured via hardware circuits, software, and/or firmware to process data. For example, processors described herein may correspond to one or more (or a combination) of a microprocessor, central processing unit (CPU,) or any other integrated circuit (IC) or other type of circuit that is capable of processing data in a data processing system. As discussed previously, the processor 162 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor 162 with the executable instructions (e.g., software/firmware apps) loaded/installed into a memory 164 (volatile and/or non-volatile), which are currently being executed and/or are available to be executed by the processor 162 to cause the processor 162 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configures to carry out the functions described herein. Further, it should be appreciated that a data processing system may also be referred to as a controller that is operative to control at least one operation.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++ or any other form of code that can be programmed/configured to cause at least one processor to carry out the acts and features described herein. Still further, results of the described/claimed processes or functions may be stored in a computer-readable medium, displayed on a display device, and/or the like FIG. 3 depicts a block diagram of a control system, herein also referred as a data processing system, in which an embodiment can be implemented, for example as a control system 160 for a delamination system 100 as described before and can be configured to perform processes as described herein.

The control system 160 depicted includes processor 162 connected to a level two cache/bridge 304, which is connected in turn to a local system bus 306. Local system bus 306 may be, for example, a peripheral component interconnect (PCI) architecture bus. Also connected to local system bus 306 in the depicted example are a main memory 164 and a graphics adapter 310. The graphics adapter 310 may be connected to display 311.

Other peripherals, such as local area network (LAN)/wide area network (WAN)/Wireless (e.g., Wi-Fi) adapter 312, may also be connected to local system bus 306. Expansion bus interface 314 connects local system bus 306 to input/output (I/O) bus 316. I/O bus 316 is connected to keyboard/ mouse adapter 313, disk controller 320, and I/O adapter 322. Disk controller 320 can be connected to a storage 326, which can be any suitable machine usable or machine readable storage medium, including but not limited to non-volatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 322 can be connected to mail processing and imaging devices 323, for example to image, scan, transport, label, address-process, sort, and otherwise processes the articles, such as parcels A, B, C, D, E of stream 110, in accordance with the various embodiments described herein. Also connected to I/O bus 316 in the example shown is audio adapter 324, to which speakers (not shown) may be connected for playing sounds. Keyboard/mouse adapter 313 provides a connection for a pointing device (not shown), such as a mouse, trackball, track-pointer, etc.

Those of ordinary skill in the art will appreciate that the hardware depicted in FIG. 3 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

LAN/WAN/Wireless adapter 312 can be connected to a network 330 (not a part of data processing system 160), which can be any public or private data processing system network or combination of networks, as known to those of skill in the art, including the Internet. LAN/WAN/Wireless adapter 312 can also communicate with parcels A, B, C, D, E as described herein and perform other data processing system or server processes described herein. Data processing system 160 can communicate over network 330 with one or more server systems 340, which are also not part of data processing system 160, but can be implemented, for example, as separate data processing systems. A server system 340 can be, for example, a central server system at a central mail processing facility.

The described system and method for delaminating articles provide high performance within a smaller footprint of the delamination unit 130 thereby increasing flexibility of the system 100. High performance may be based on the use of a high-resolution detection system, such as vision system 150 with digital cameras. Further, instead of belted conveyor sections, variable speed and reversible rollers 134 including primary and secondary planes 132, 136 are provided. Costs may be reduced by reduction and possible elimination of manual tenders (increased capital versus labor value proposition) and increased throughput of articles (increasing capital versus capital value proposition).

The invention claimed is:

1. A system for delaminating a stream of articles comprising:
    a delamination unit comprising a plurality of individually controlled rollers configured to carry the stream of articles,
    a detection unit comprising at least one sensor, and
    a control unit comprising at least one processor and interfacing with the delamination unit and the detection unit,
    wherein the detection unit is configured to detect a position of each of the articles and to transmit position data to the control unit,
    wherein the control unit is configured, through operation of the at least one processor, to correlate the positions of the articles with the plurality of individually controlled rollers, and to individually control the rollers based on the position data to delaminate the stream of articles; and
    wherein the individually controlled rollers of the delamination unit are grouped, and wherein groups of rollers are arranged in multiple different secondary planes.

2. The system of claim 1, wherein the detection unit is further configured to detect size and orientation of each of the articles, and the control unit is further configured, through operation of the at least one processor, to correlate size and orientation of the articles with the plurality of individually controlled rollers.

3. The system of claim 1, wherein the individually controlled rollers of the delamination unit are arranged in a laterally tilted inclined plane.

4. The system of claim 1, wherein each group comprises at least two of the individually controlled rollers.

5. The system of claim 1, wherein the control unit is configured, through operation of the at least one processor, to individually control speed and direction of each of the rollers of the delamination unit.

6. The system of claim 5, wherein the detection unit is configured to continuously track the positions of the articles, and the control unit is further configured, through operation of the at least one processor, to optimize the speed and direction of each roller based on continuously transmitted position data provided by the detection unit to delaminate and/or singulate the stream of articles.

7. The system of claim 1, wherein the detection unit comprises a vision unit with at least one image sensor.

8. The system of claim 7, wherein the at least one image sensor comprises at least one digital camera.

9. A method for delaminating a stream of articles comprising:
    through operation of at least one processor in a control system configured via executable instructions included in at least one memory:
    receiving position data of each of the articles carried by a delamination unit comprising a plurality of individually controlled rollers via a detection unit comprising at least one sensor configured to detect a position of each of the articles,
    correlating the position data with the plurality of the individually controlled rollers via a controller unit comprising at least one processor where the controller unit interfaces with the delamination unit and the detection unit, and
    controlling speed and direction of each of the rollers of the plurality of individually controlled rollers based on the position data to delaminate the articles, wherein the individually controlled rollers are grouped, and wherein groups of rollers are arranged in multiple different secondary planes.

10. The method of claim 9, further comprising:
    through operation of the at least one processor in the control system:
    receiving size and orientation data of the articles carried by the delamination unit, and
    correlating the size and position data with the plurality of individually controlled rollers of the delamination unit, and controlling the speed and direction of each of the plurality of individually controlled rollers based on the size and orientation data to delaminate the articles.

11. The method of claim 10, wherein the position, size and orientation data are provided by a detection unit comprising a vision unit with at least one image sensor.

12. The method of claim 9, further comprising:
through operation of at least one processor in the control system:
individually controlling speed and direction of each of the rollers of the delamination unit.

13. The method of claim 12, wherein the position data of the articles are continuously tracked, and the control unit is further configured, through operation of the at least one processor, to optimize the speed and direction of each roller based on continuously received position data to delaminate and/or cingulate the articles.

14. A non-transitory computer readable medium comprising instructions that when executed by at least one processor perform a method for delaminating a stream of articles comprising:
through operation of at least one processor in a control system configured via executable instructions included in at least one memory;
receiving position data of articles carried by a delamination unit comprising a plurality of individually controlled rollers via a detection unit comprising at least one sensor configured to detect a position of each of the articles,
correlating the position data with the plurality of individually controlled rollers via a controller unit comprising at least one processor where the controller unit interfaces with the delamination unit and the detection unit, and
controlling speed and direction of each of the rollers of the plurality of individually controlled rollers based on the position data to delaminate the articles, wherein individually controlled rollers are grouped, and wherein groups of rollers are arranged in multiple different secondary planes.

* * * * *

UNITED STATES PATENT AND TRADEMARK OFFICE
CERTIFICATE OF CORRECTION

PATENT NO. : 11,958,695 B2
APPLICATION NO. : 16/977179
DATED : April 16, 2024
INVENTOR(S) : Michael D. Carpenter It is certified that error appears in the above-identified patent and that said Letters Patent is hereby corrected as shown below:

In the Specification

Column 1, Line 33:
"de-shingling" should be — de-mingling —

Column 1, Line 66:
"delamination" should be — delaminating —

Column 2, Line 3:
After "of" insert -- a --

Column 2, Line 31:
After "of" insert -- a --

Column 2, Line 32:
After "articles" insert -- in --

Column 2, Line 51:
"side-by side" should be — side-by-side —

Column 5, Line 25:
"3" should be — 8 —

Column 5, Line 39:
"process" should be — processed —

Column 5, Line 59:
"(CPU,)" should be — (CPU), —

Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,958,695 B2

Column 6, Line 23:
"configures" should be — configured —

Column 6, Line 48:
After "like" insert -- . --

Column 6, Line 50:
After "referred" insert -- to --

Column 7, Line 14:
"processes" should be — process —

In the Claims

Column 9, Claim 13, Line 17:
"cingulate" should be — singulate —